United States Patent [19]

Watanabe

[11] Patent Number: 5,608,310

[45] Date of Patent: Mar. 4, 1997

[54] AC GENERATOR CONTROL APPARATUS FOR A MOTOR VEHICLE

[75] Inventor: Hirofumi Watanabe, Himeji, Japan

[73] Assignee: Mitsubishi Denki Kabushiki Kaisha, Tokyo, Japan

[21] Appl. No.: 420,647

[22] Filed: Apr. 12, 1995

[30]     Foreign Application Priority Data

Apr. 20, 1994   [JP]   Japan .................................... 6-081818

[51] Int. Cl.$^6$ ...................................................... H02P 9/00
[52] U.S. Cl. ............................................. 322/29; 322/28
[58] Field of Search ........................................ 322/28, 29

[56]               References Cited

U.S. PATENT DOCUMENTS 5,444,354   8/1995   Takahashi et al. ......................... 322/28
5,469,816  11/1995   Marakawa et al. .......................... 123/2

FOREIGN PATENT DOCUMENTS

141945   9/1986   Japan .
207142   9/1986   Japan .

*Primary Examiner*—Steven L. Stephan
*Assistant Examiner*—Nicholas Ponomarenko
*Attorney, Agent, or Firm*—Sughrue, Mion, Zinn, Macpeak & Seas

[57]                ABSTRACT

An AC generator control apparatus for a motor vehicle includes an AC generator driven by an engine for generating an output voltage for charging an onboard battery, a rotation sensor for detecting an engine rotation number, a shift position sensor for detecting a shift position indicating a gear ratio of a transmission, and a control means responsive to the engine rotation number information to change stepwise with fine control the output voltage of the generator in depending on the gear shift positions within a predetermined range of engine rotation numbers. Not only the battery charge efficiency, but also the running performance and fuel efficiency of the motor vehicle can be enhanced with high reliability, while ensuring improved braking performance.

5 Claims, 6 Drawing Sheets

Ns1 : PREDETERMIND ROTATION NUMBER

Ns2 : PREDETERMIND ROTATION NUMBER

FIG. 6

AC GENERATOR CONTROL APPARATUS FOR A MOTOR VEHICLE

BACKGROUND OF THE INVENTION

1. Field of the Invention

The present invention generally relates to an AC generator control apparatus for a motor vehicle for controlling an output voltage level of an AC generator which is driven by an internal combustion engine (hereinafter also referred to as the engine for short) and which is used for electrically charging an onboard battery of the motor vehicle. More particularly, the invention is concerned with an AC generator control apparatus of the type mentioned above which can ensure improvement of battery charging efficiency while allowing the running performance as well as fuel cost performance, of the motor vehicle to be improved by controlling the output voltage of the AC generator with high reliability.

2. Description of Related Art

In conjunction with the AC generator mounted on a motor vehicle for electrically charging an onboard battery thereof, the output voltage of the generator is set to a relatively low level (e.g. at 12.5 V) when the motor vehicle is running in a steady state at a relatively high speed. This is done with a view to improving or enhancing the running performance as well as the fuel cost performance of the motor vehicle by reducing a load imposed on the engine by the generator.

On the other hand, when the engine (and hence, the motor vehicle) is decelerated, the output voltage of the generator is changed over to a relatively high level (normal voltage level of, e.g., 14.5 V) in order to ensure sufficient braking efforts.

As an example of an AC generator control apparatus for controlling the electric power generated by the AC generator depending on the operation state of the engine of the motor vehicle in the manner mentioned above, there is known an apparatus which is disclosed, for example, in Japanese Utility Model Publication No. 28190/1992 (Japanese Utility Model Laid-Open No. 61-141945. For more particulars of this known control apparatus, reference should be made to the above-mentioned publication.

However, the AC generator control apparatuses known heretofore suffer shortcomings, which will be described below. The conventional control apparatus is so designed as to change, simply, the output power of the AC generator depending on the engine operation state of the motor vehicle. As a consequence, if the electric load of the motor vehicle increases with the engine in the steady running state (which will naturally be accompanied with a lowering of the battery voltage below a predetermined value or level), the generator starts to generate electric power to charge the battery. Thus, there may undesirably arise a situation which the engine load is not mitigated, even though in the steady state operation, presenting an obstacle to realization of desired running performance of the motor vehicle.

To cope with the problem mentioned above, there has already been proposed an AC generator control apparatus which is so designed as to change over the output voltage of the generator to a relatively high level to promote the charging of the battery when the motor vehicle is running at a speed higher than a predetermined value. Also, when the motor vehicle is running at a speed lower than the predetermined value, the output voltage of the generator is changed over to a lower level, to thereby suppress to a minimum the frequency at which the battery is charged. In that case, when it is detected that the speed of the motor vehicle exceeds a predetermined value, the level of a signal for controlling the output voltage of the generator is changed over from a low (L) level to a high (H) level. In other words, the control signal for controlling the output voltage of the generator has only two discrete levels (i.e., "L" level and "H" level).

Additionally, as is disclosed in Japanese Utility Model Publication No. 28190/1992, there has also been proposed a control apparatus for changing the electric power generated by the generator in dependence on an output signal produced by a shift position sensor which is adapted to detect shift positions indicating gear ratios of the transmission of the motor vehicle. More specifically, with this known control apparatus for the AC generator, such control is performed that when the motor vehicle is running in a high-speed steady state in which the output voltage of the generator is set at a relatively low level, a reference vehicle speed serving as a threshold value in a decision process for increasing the output voltage (or output power) of the generator in dependence on the speed of the motor vehicle is increased as the gear ratio indicated by the detected shift position signal is higher. In this case, the reference speed of the motor vehicle is increased by changing the predetermined value used for deciding the vehicle speed in dependence on the effective gear ratio as detected.

As can be seen from the above description of the AC generator control apparatuses known heretofore, the output voltage of the generator is controlled or changed on the basis of only the vehicle speed or alternatively the engine rotation number (rpm) which is one of the parameters indicating the operation state of the engine or the motor vehicle.

Further, in conjunction with the generator control apparatus disclosed in the utility model publication mentioned previously in which the output voltage of the generator is changed over to higher level depending on the gear-ratio shift positions, it has to be pointed out that the signal indicative of the engine rotation number is used only for the purpose of inhibiting the output power of the generator from being changed when the transmission of the motor vehicle is in the neutral position. In other words, the engine rotation number, which plays a very important role in controlling the output voltage of the generator, is not straightforwardly utilized for changing the output voltage of the generator. Such being the circumstances, with the AC generator control apparatus disclosed in the aforementioned publication, it is difficult or impossible to detect the operation state of the engine of the motor vehicle with high accuracy and reliability, which ultimately presents a primary cause for degradation of reliability and fidelity of the output power control of the generator.

As will now be understood from the foregoing discussion, the AC generator control apparatuses for the motor vehicle proposed heretofore suffer a drawback in that the reliability of the AC generator control remains low because the control resorts to only the gear-ratio shift position and/or the motor vehicle speed. Another problem of the hitherto known AC generator control apparatuses is that when the state in which the output voltage of the generator is set relatively low continues to exist, degradation will be involved in the battery charging efficiency.

SUMMARY OF THE INVENTION

In the light of the state of the art described above, it is an object of the present invention to provide an AC generator control apparatus for a motor vehicle which can enhance the battery charging efficiency, the running performance, and the fuel cost performance of the motor vehicle while ensuring improved braking performance with high reliability.

Another object of the present invention is to provide an AC generator control apparatus for a motor vehicle which is capable of enhancing the battery charging efficiency above all.

It is yet another object of the present invention is to provide a novel AC generator control apparatus for a motor vehicle which can ensure improved running performance as well as improved fuel cost performance of the motor vehicle.

In view of the above and other objects which will become apparent as the description proceeds, there is provided according to a general aspect of the present invention an AC generator control apparatus for a motor vehicle, which apparatus includes an electric generator driven by an internal combustion engine of the motor vehicle for generating an output voltage for charging an onboard battery of the motor vehicle, an engine rotation sensor for detecting rotation of the engine to thereby generate engine rotation information, a shift position sensor for detecting a currently effective one of shift positions for changing over gear ratios of a transmission, and a control means responsive to the engine rotation information for changing an output voltage of the electric generator in dependence on the currently effective shift position.

With the arrangement of the AC generator control apparatus described above, it is possible to change or regulate stepwise and finely the output voltage of the AC generator in dependence on the gear-ratio shift positions in a predetermined engine operation (rotation) state. Thus, there is realized an AC generator control apparatus for the motor vehicle which can ensure improvement of the battery charge efficiency, running performance and the fuel cost performance of the motor vehicle while assuring excellent braking performance with high reliability.

In a preferred mode for carrying out the invention, the engine rotation information may be information which indicates the rotation number of the engine. In that case, the control means mentioned above may be comprised of a rotation number decision means for deciding whether or not the engine rotation number, as detected, is smaller than a predetermined rotation number inclusive thereof, wherein when the engine rotation number as detected is not greater than the predetermined engine rotation number, the control means changes over the output voltage of the electric generator sequentially to higher levels in dependence on the gear-ratio change-over shift positions.

By virtue of the above arrangement, the battery charging efficiency can significantly be improved above all.

In another preferred mode for carrying out the present invention, the engine rotation information may be information which indicates the rotation number of the engine, wherein the control means may be comprised of a rotation number decision means for deciding whether or not the engine rotation number as detected is greater than a predetermined rotation number inclusive thereof, wherein when the engine rotation number as detected is not smaller than the predetermined engine rotation number, the control means changes over the output voltage of the electric generator sequentially to lower levels in dependence on the gear-ratio change-over shift positions.

With the arrangement described above, the running performance and the fuel cost performance inter alia can remarkably be improved.

The control of the output voltage of the AC generator may equally be realized by using a microcomputer programmed correspondingly.

Thus, according to another aspect of the present invention, there is provided a method of regulating an output voltage of an AC generator mounted on a motor vehicle for electrically charging an onboard battery thereof, which method includes a step of deciding whether or not the motor vehicle is running at a speed lower or higher than a predetermined speed value, a step of responding to the decision that the motor vehicle is running at a speed lower or higher than the predetermined speed value to thereby detect a shift position indicative of a gear ratio of a transmission which is currently effective, and a step of regulating the output voltage of the generator to a level corresponding to the detected shift position.

The above and other objects, features and attendant advantages of the present invention will more easily be understood by reading the following description of the preferred embodiments thereof taken, only by way of example, in conjunction with the drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as the preferred or typical embodiments thereof by reference to the drawings. In the following description, like reference characters designate like or corresponding parts throughout the several views.

Embodiment 1

Figure 1:
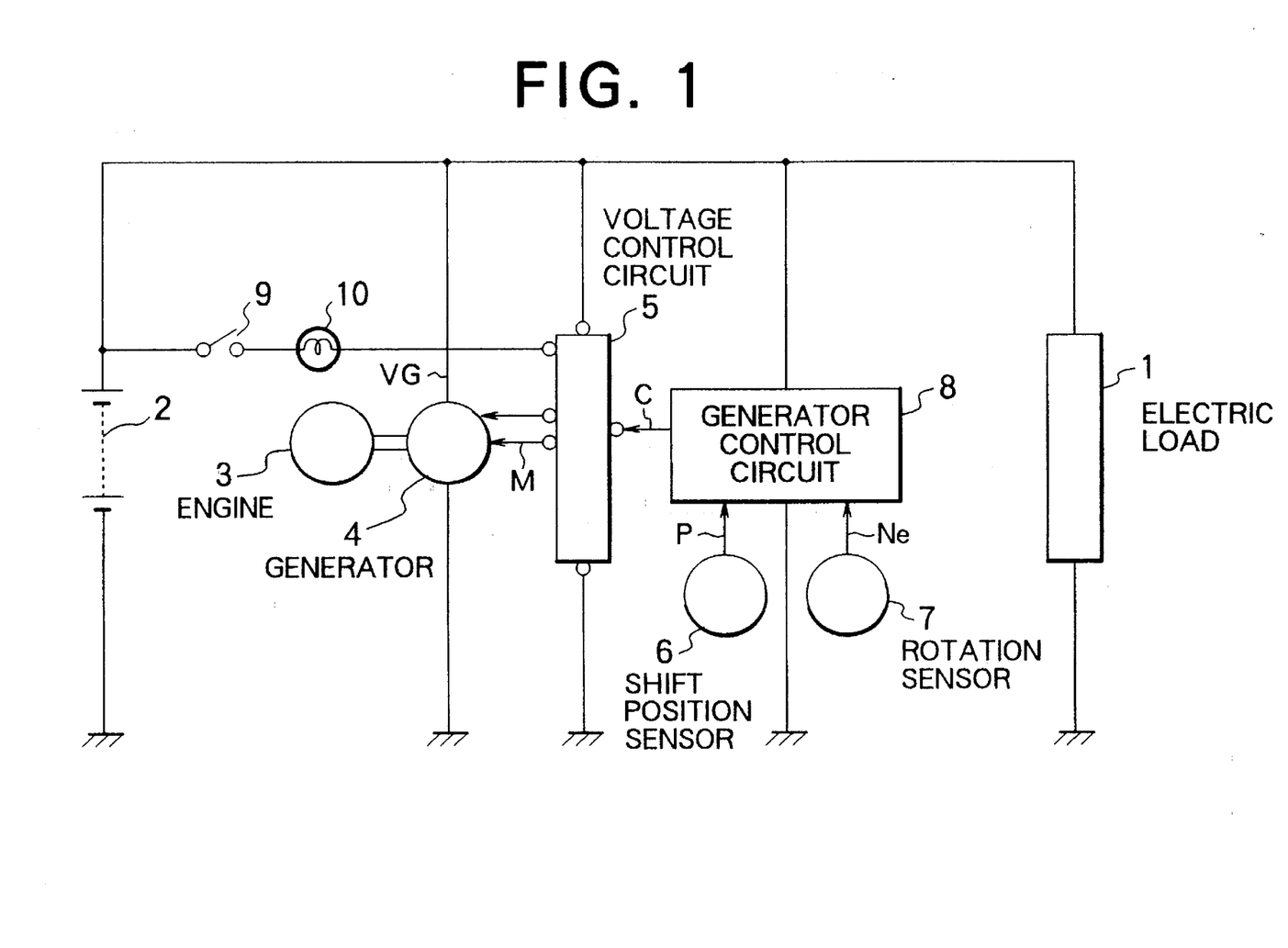
FIG. 1 is a schematic circuit diagram showing in general a structure of an AC generator control apparatus according to a first embodiment of the present invention.

Referring to FIG. 1, which is a schematic circuit diagram showing generally a structure of an AC generator control apparatus according to a first embodiment of the present invention, an electric load 1 of a motor vehicle (not shown) is supplied with electric power from a power supply constituted by an onboard battery 2, which is adapted to be charged by an electric generator 4 driven by an internal combustion engine 3 constituting a prime mover for the motor vehicle. The generator 4 has an output terminal connected to the battery 2.

Further connected between the output terminal of the generator 4 and the ground potential is a voltage control circuit 5 which serves for controlling excitation of the generator 4 in accordance with a control signal supplied from a generator control circuit 8 (described in detail hereinafter) to thereby change the output voltage VG of the AC generator 4. A shift position sensor circuit 6 is provided for detecting a shift position P, indicating a currently effective gear ratio of a transmission (not shown). A rotation sensor 7 which may be constituted, for example, by a rotary encoder, is provided for detecting the rotation number (rpm) Ne of the internal combustion engine 3. The generator control circuit 8, mentioned above, generates a control signal C on the basis of the shift position P and the engine rotation number Ne, the control signal C then being supplied to the voltage control circuit 5. An on/off switch 9 is interposed between the battery 2 and the voltage control circuit 5. Further, a pilot lamp 10 is connected between the on/off switch 9 and the voltage control circuit 5.

Figure 2:
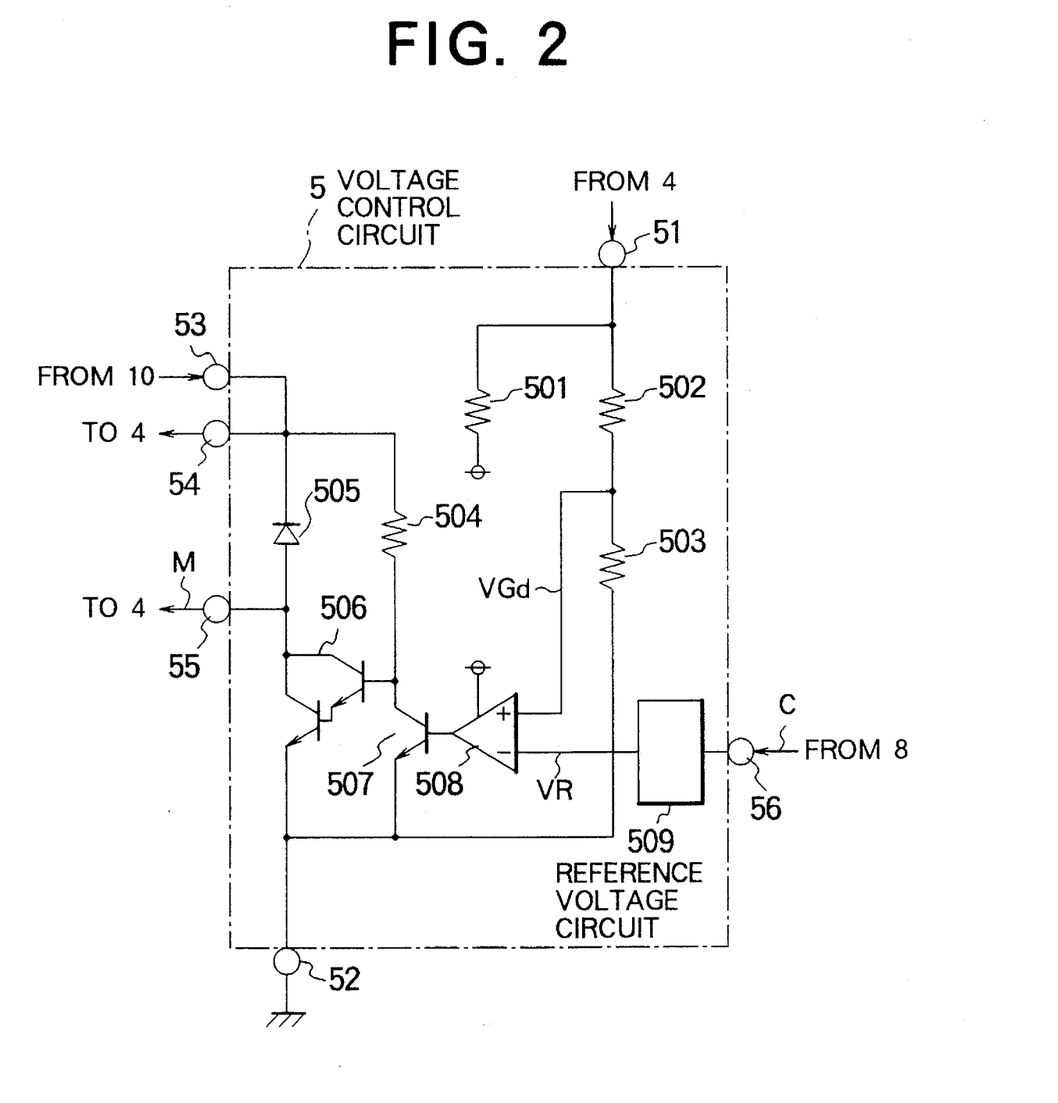
FIG. 2 is a circuit diagram showing a circuit configuration of a voltage control circuit incorporated in the AC generator control apparatus shown in FIG. 1.

FIG. 2 is a circuit diagram showing a configuration of the voltage control circuit 5 incorporated in the generator output control apparatus shown in FIG. 1. As can be seen in the figure, the voltage control circuit 5 has a voltage input terminal 51 to which the output voltage VG of the generator 4 or the terminal voltage of the battery 2 is applied. Further, the voltage control circuit 5 has a terminal 52 connected to the ground potential, an input terminal 53 connected to the pilot lamp 10, a terminal 54 and a control output terminal 55 for outputting an excitation control signal M for the AC generator 4, and a control input terminal 56 to which the control signal C is applied from the generator control circuit 8.

In FIG. 2, input resistors 501, 502 and 503 are connected to the voltage input terminal 51 to provide appropriate resistances to the output voltage VG of the generator 4. A resister 504 is connected between the terminal 54 and a base of a transistor of transistor circuit 506. A diode 505 is inserted between the control output terminal 55 and the terminal 54. Transistor circuit 506, comprised of Darlington-connected transistors, is inserted between the control output terminal 55 and the grounded terminal 52. On the other hand, a transistor 507 is inserted between the resistor 504 and the grounded terminal 52. Further, a comparator 508 is provided for comparing a signal VGd indicative of the generator output voltage resulting from voltage division of the output voltage VG of the generator 4 by the resisters 502 and 503 with a reference voltage VR which is generated by a reference voltage circuit 509 on the basis of the control signal C mentioned previously.

Figure 3:
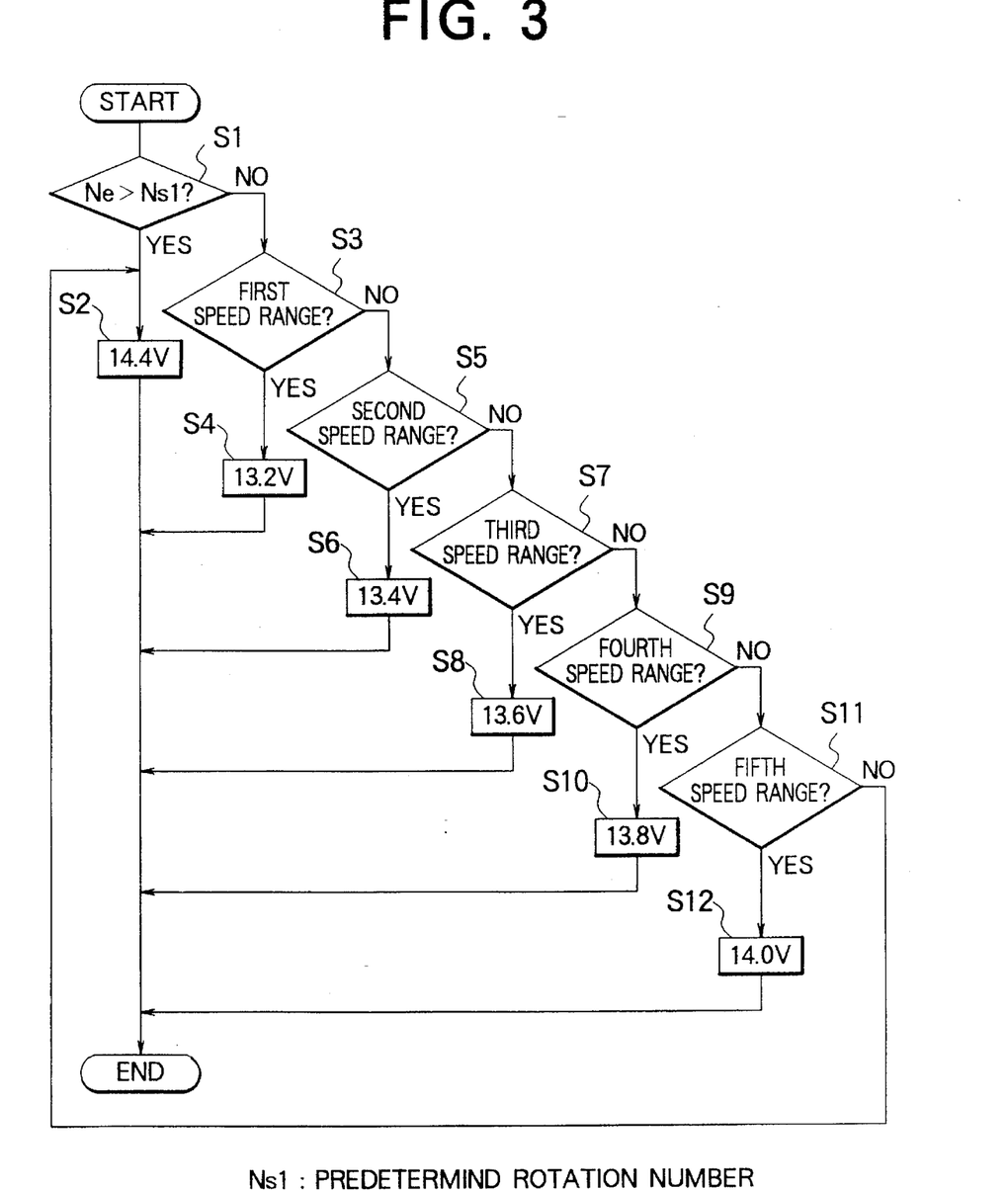
FIG. 3 is a flow chart illustrating a procedure for controlling stepwise the output voltage of an AC generator by the control apparatus according to the first embodiment of the invention.
Figure 4:
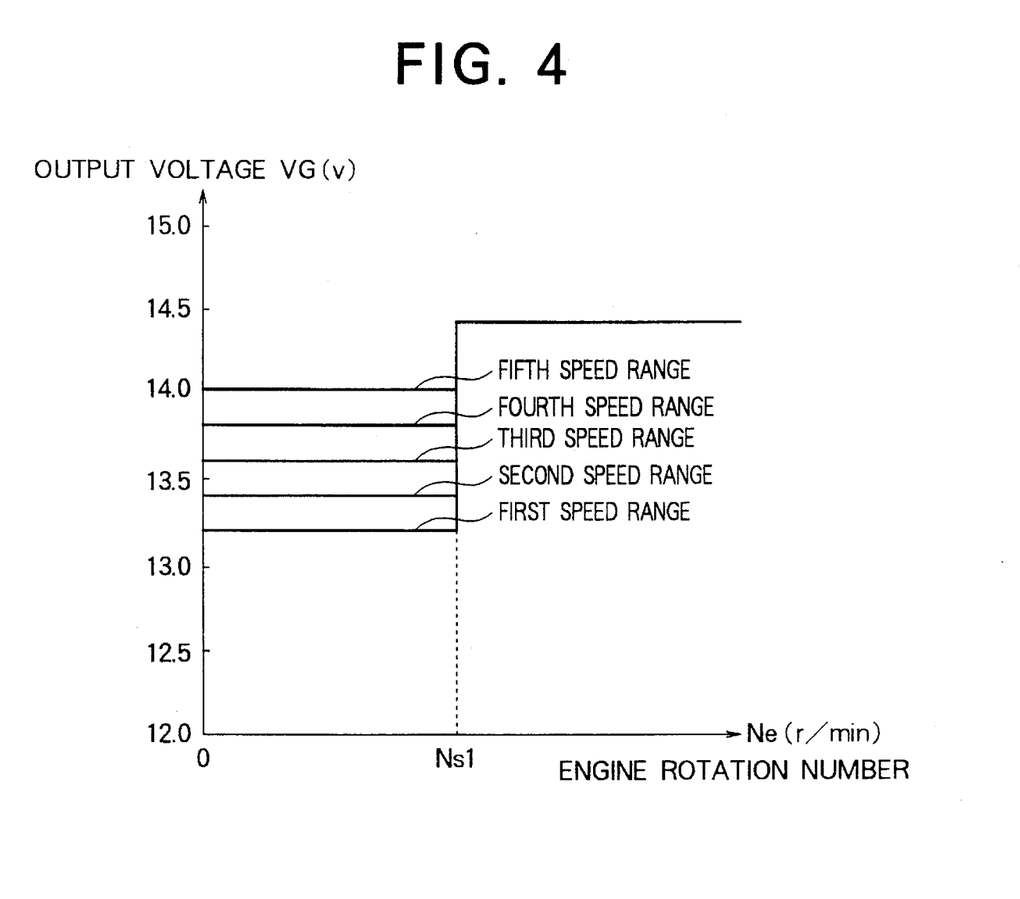
FIG. 4 is a characteristic diagram for illustrating generator output voltage-versus-engine rotation number relations with speed shift positions being used as parameters within a predetermined range of the engine speed.

Next, description will turn to the operation of the AC generator control apparatus according to the instant embodiment of the invention by referring to the flow chart of FIG. 3 and the voltage characteristic diagram of FIG. 4 together with FIGS. 1 and 2.

In a step S1 shown in FIG. 3, the generator control circuit 8 fetches the signal indicative of the engine rotation number Ne as outputted from the rotation sensor 7 to make a decision whether or not the engine rotation number Ne is greater than a predetermined rotation number (rpm) Ns1, i.e., whether the condition that Ne>Ns1 is satisfied.

When it is decided that the engine rotation number Ne is greater than the predetermined rotation number Ns1 (i.e., when the decision step S1 results in affirmation "YES"), the output voltage VG of the generator 4 is regulated or set to a normally high voltage level of 14.4 V independent of the shift position P in a step S2 (see FIG. 4).

On the contrary, when the above decision results in that Ne≦Ns1 (i.e., the answer of the decision step S1 is negative "NO"), the shift position P detected by the shift position sensor 6 is referenced to thereby set the control level for the output voltage VG of the generator 4 depending on the relevant shift position P through a procedure including steps S3 to S12.

More specifically, it is first decided in the step S3 whether the shift position P of the transmission (not shown) corresponds to a first speed range. When this decision step S3 results in affirmation "YES", the output voltage VG of the generator 4 is set to a first output voltage level of 13.2 V in the step S4 (also see FIG. 4). On the other hand, when the answer of the decision step S3 is negative "NO", then the step S5 is executed for determining whether or not the shift position P of the transmission corresponds to the second speed range. In case the answer of this decision step S5 is "YES", the output voltage VG of the generator 4 is set to a second output voltage of 13.4 V in the step S6 (also see FIG. 4).

Through a similar procedure, it is decided in step S7 whether or not the shift position P corresponds to a third speed range. If so, the output voltage VG of the generator 4 is set to a third output voltage of 13.6 V in step S8 and, if otherwise, a decision is made in step S9 as to whether the shift position P corresponds to a fourth speed range. If so, the output voltage VG of the generator 4 is set to a fourth output voltage of 13.8 V in step S10. Otherwise, step S11 is executed for making a decision whether the shift position P corresponds to a fifth speed range. When the decision step S11 results in "YES", the output voltage VG of the generator 4 is then set to a fifth output voltage of 14.0 V in step S12. By contrast, when the decision in step S11 results in negation "NO", then the processing resumes with step S2, where the output voltage VG of the generator 4 is regulated to be 14.4 V.

In this manner, when the engine is running in a low speed range, in which the engine rotation number Ne is smaller than the predetermined rotation number Ns1, the output voltage VG of the generator 4 is selectively changed over to one of the first to fifth voltage levels depending on the shift position corresponding to the effective one of the first to fifth gear ratios. By way of example, when the shift position P is decided as corresponding to the fifth speed range and when the motor vehicle is running in the operation state where the engine rotation number Ne is smaller than the predetermined rotation number Ns1, the output voltage VG of the generator 4 is regulated or controlled to be 14.0 V (see FIG. 4).

The generator control circuit 8 outputs the control signal C indicating the voltage set in the manner described above. Voltage control circuit 5 responds to the control signal C thereby to generate an excitation control signal M for the generator 4 for controlling excitation thereof such that the output voltage of the generator 4 corresponds to the established voltage level. More specifically, the reference voltage circuit 509, incorporated in the voltage control circuit 5, generates the reference-voltage VR which accords with the control signal C, while the comparator 508 drives the transistors 506 and 507 so that the generator output voltage VGd coincides with the reference voltage VR, whereby the corresponding excitation control signal M for the AC generator 4 is generated by the voltage control circuit 5.

In this way, excitation of the generator 4 is controlled in accordance with the control signal C, as a result of which the generator 4 generates the output voltage VGd which corresponds to the shift position P indicative of the effective gear ratio so long as the engine rotation number Ne falls within a low speed range of the motor vehicle (see FIG. 4). On the other hand, for the engine rotation number Ne falling within a high speed range of the motor vehicle, the output voltage VG of the generator 4 is fixedly set to the normal output voltage level of 14.4 V (see FIG. 4).

By setting the output voltage VG on the basis of the engine rotation number Ne in the manner described above, the running performance as well as cost performance, of the motor vehicle is enhanced, while the battery charging efficiency can be increased in a high-speed operation range of the motor vehicle. Further, it should be added that when the motor vehicle is changed over to a low-speed operation state upon deceleration thereof, the braking performance of the motor vehicle can equally be enhanced because the output voltage VG of the AC generator 4 increases as the shift position P becomes higher.

Embodiment 2

In the AC generator control apparatus according to the first embodiment of the invention, the output voltage VG of the generator 4 is set to the normal output voltage of 14.4 V in the high-speed operation range of the motor vehicle where the engine rotation number Ne is greater than the predetermined rotation number Ns1, but is selectively changed over to progressively higher levels in accordance with the shift positions P when the motor vehicle is running in a low-speed running state in which the engine rotation number Ne is not greater than the predetermined rotation number Ns1. This places greater importance onto realization of high-efficiency in charging the battery 2. However, when greater importance is placed on the realization of high running performance as well as high cost performance, the output voltage VG of the generator 4 may be changed over sequentially to lower levels in depending on the shift positions P when the motor vehicle is running in a high-speed operation state in which the engine rotation number Ne exceeds a second predetermined rotation number Ns2 which is greater than the first mentioned rotation number Ns1. The second embodiment of the invention is directed to this sort of control.

Now, referring to flow chart of FIG. 5 and characteristic diagram of FIG. 6, description will be made of the operation of the AC generator control apparatus according to a second embodiment of the invention which is directed to the control of the output voltage of the generator 4 depending on the shift positions P when the motor vehicle is in a high-speed running state.

The second embodiment of the invention differs from the first embodiment with respect to only the processing routine executed by the generator control circuit 8 incorporated in the apparatus shown in FIG. 1. Further, in FIG. 5, steps S3, S5, S7, S9 and S11 are similar to the shift position decision steps mentioned hereinbefore.

Figure 5:
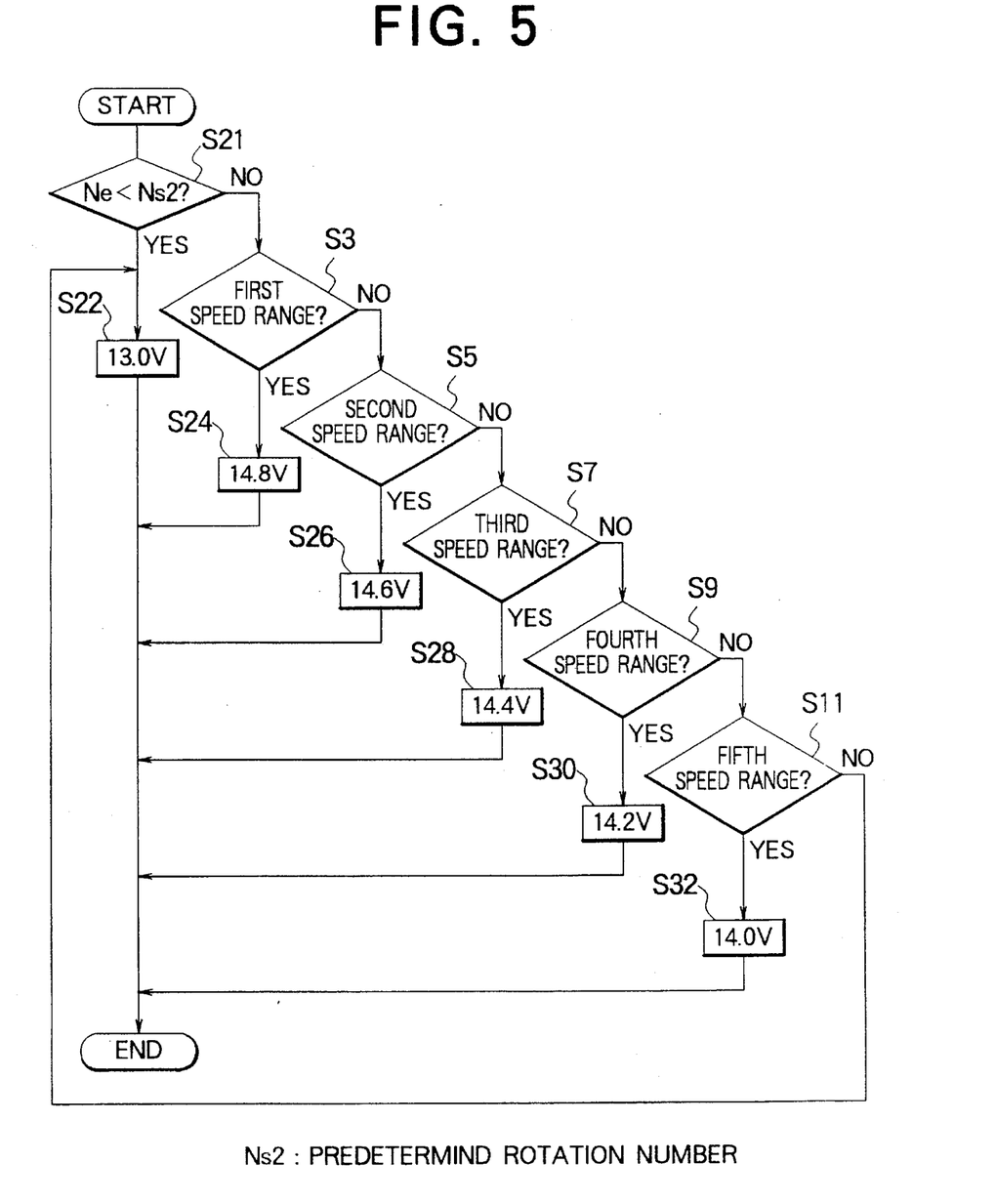
FIG. 5 is a flow chart for illustrating a procedure for controlling stepwise the output voltage of an AC generator by a control apparatus according to a second embodiment of the present invention.
Figure 6:
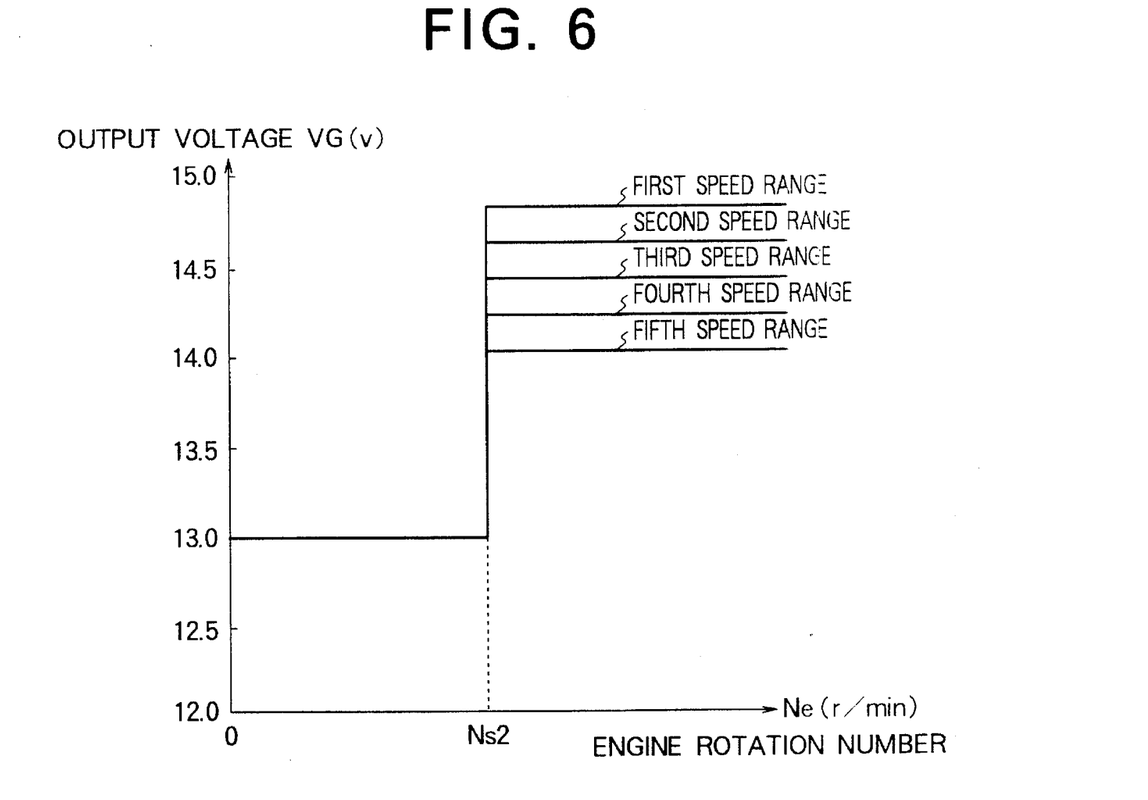
FIG. 6 is a characteristic diagram similar to that of FIG. 4 for illustrating corresponding relations in the control effected by the apparatus according to the second embodiment of the invention.

Now, referring to FIG. 5, the generator control circuit 8 makes decision at first whether or not the engine rotation number Ne is smaller than the predetermined rotation number Ns2 (step S21). When the decision results in that Ne<Ns2 (i.e., "YES"), the output voltage VG of the generator 4 is so controlled as to be fixedly set to a low voltage level of 13.0 V regardless of the shift position P (step S22).

On the other hand, when the decision step S21 results in that Ne≧Ns2 (i.e., "NO"), the shift positions P are determined in the manner as described hereinbefore in conjunction with the steps S3, S5, S7, S9 and S11, and the control levels for the output voltage VG of the generator 4 are controlled or regulated so that the output voltage VG of the generator 4 assumes sequentially lower values depending on the shift positions P, respectively.

More specifically, when the shift position P is decided corresponding to the first speed range (step S3), the output voltage VG of the generator 4 is controlled so as to assume a sixth output voltage of 14.8 V (step S24), while when the shift position P indicates the second speed range (step S5), the output voltage VG is set to a seventh output voltage of 14.6 V (step S26). Further, when it is decided that the shift position P corresponds to the third speed range (step S7), the output voltage VG of the generator 4 is set to an eighth output voltage of 14.4 V (step S28), while when the shift position P indicates the fourth speed range (step S9), the output voltage VG is controlled to be set to a ninth output voltage of 14.2 V (step S30). Furthermore, when the shift position P indicates the fifth speed range (step S11), the output voltage VG is set to a tenth output voltage of 14.0 V (step S32). On the other hand, when the decision step S11 mentioned above results in negation "NO", the step S22 is resumed to set the output voltage VG of the generator 4 to the output voltage of 13.0 V.

In this way, when the motor vehicle is running at a speed which exceeds the predetermined rotation number Ns2 inclusive thereof, the output voltage VG of the generator 4 is controlled so as to assume the sixth to tenth voltage levels (i.e., sequentially lower voltage levels) depending on the shift positions P, respectively. The voltage control circuit 5 responds to the control signal C outputted from the generator control circuit 8, and indicative of one of the output voltage command values mentioned above to thereby generate the excitation control signal M for controlling the excitation of the generator 4 so that the output voltage VG thereof coincides with the command value.

In this way, the output voltage VG of the generator 4 is controlled so as to be set to a lower voltage in dependence on each of the shift positions P when the engine rotation number Ne lies within a high-speed range, whereby the running performance and the fuel cost performance among others, can be improved. Besides, because the output voltage VG of the generator 4 is set high when the motor vehicle is to be decelerated by shifting down the gear ratio in the course of high-speed operation of the motor vehicle, sufficient braking efforts can be ensured.

It goes without saying that in the case of the AC generator control apparatus according to the second embodiment of the invention, high reliability can be ensured for the control of the output voltage VG of the generator 4 while enhancing the running performance and the fuel cost performance with the battery charging efficiency being equally improved.

Many modifications and variations of the present invention are possible in the light of the above techniques. By way of example, although the invention has been described on the assumption that the generator control circuit 8 and the voltage control circuit 5 are implemented in discrete hardware circuits, it goes without saying that they can be equally implemented by a microcomputer programmed correspondingly. It is therefore to be understood that within the scope of the appended claims, the invention may be practiced otherwise than as specifically described.

What is claimed is:

1. An AC generator control apparatus for a motor vehicle, comprising:

an electric generator driven by an internal combustion engine of said motor vehicle for generating an output voltage for charging an onboard battery of said motor vehicle;

engine rotation detecting means for detecting rotation of said engine to thereby generate engine rotation information;

shift position detecting means for detecting a currently effective one of shift positions for changing over gear ratios of a transmission; and control means responsive to said engine rotation information for changing an output voltage of said electric generator in dependence on said currently effective shift position.

2. An AC generator control apparatus for a motor vehicle according to claim 1, wherein said engine rotation information indicates rotation number of said engine, said control means including rotation number decision means for deciding whether or not said engine rotation number as detected is smaller than a predetermined rotation number inclusive thereof, wherein when said engine rotation number as detected is not greater than said predetermined engine rotation number, said control means changes over the output voltage of said electric generator sequentially to higher levels in dependence on said gear-ratio change-over shift positions.

3. An AC generator control apparatus for a motor vehicle according to claim 1, wherein said engine rotation information indicates rotation number of said engine, said control means including rotation number decision means for deciding whether or not said engine rotation number as detected is greater than a predetermined rotation number inclusive thereof, wherein when said engine rotation number as detected is not smaller than said predetermined engine rotation number, said control means changes over the output voltage of said electric generator sequentially to lower levels in dependence on said gear-ratio change-over shift positions.

4. A method of regulating an output voltage of an AC generator mounted on a motor vehicle for electrically, charging an onboard battery thereof; comprising the steps of:

deciding whether said motor vehicle is running at an engine speed lower than a predetermined engine speed value;

responding to the decision that said motor vehicle is running at an engine speed lower than said predetermined engine speed value to thereby detect a shift position indicative of a gear ratio of a transmission which is currently effective; and regulating the output voltage of said generator to a level corresponding to said detected shift position.

5. A method of regulating an output voltage of an AC generator mounted on a motor vehicle for electrically charging an onboard battery thereof, comprising the steps of:

deciding whether said motor vehicle is running at an engine speed higher than a predetermined engine speed value;

responding to the decision that said motor vehicle is running at an engine speed higher than said predetermined engine speed value to thereby detect a shift position indicative of a gear ratio of a transmission which is currently effective; and regulating the output voltage of said generator to a level corresponding to said detected shift position.

* * * * *